United States Patent
Kamishima et al.

[11] Patent Number: 6,064,938
[45] Date of Patent: May 16, 2000

[54] CRUISE CONTROL APPARATUS AND METHOD FOR AUTOMOTIVE VEHICLE

[75] Inventors: Hiroyuki Kamishima, Yokohama; Toshimasa Miwa, Kanagawa; Kazuhiko Ito, Saitama; Masakazu Imai, Yokohama; Tetsuya Asada, Kanagawa, all of Japan

[73] Assignee: Nissan Motor Co., Ltd., Kanagawa, Japan

[21] Appl. No.: 09/040,506

[22] Filed: Mar. 18, 1998

[30] Foreign Application Priority Data

Mar. 24, 1997 [JP] Japan .................................. 9-069670

[51] Int. Cl.$^7$ .................................................. B60K 31/00
[52] U.S. Cl. .............................. 701/97; 701/93; 180/170; 180/179; 123/352
[58] Field of Search .................................. 701/34, 93, 96, 701/97, 110; 123/350, 352; 180/176, 177, 178, 179, 170

[56] References Cited

U.S. PATENT DOCUMENTS

| | | |
|---|---|---|
| 4,394,739 | 7/1983 | Suzuki et al. ............................. 701/97 |
| 4,451,890 | 5/1984 | Suzuki et al. ............................. 701/97 |
| 4,835,696 | 5/1989 | Suzuki et al. ........................... 180/179 |
| 4,890,231 | 12/1989 | Frantz ..................................... 180/170 |
| 4,991,677 | 2/1991 | Suzuki ...................................... 701/97 |
| 5,050,698 | 9/1991 | Maeda et al. ............................. 701/97 |
| 5,218,544 | 6/1993 | Fujiwara et al. ......................... 701/97 |
| 5,624,005 | 4/1997 | Torii ...................................... 180/179 |

*Primary Examiner*—Gary Chin
*Attorney, Agent, or Firm*—McDermott, Will & Emery

[57] ABSTRACT

In apparatus and method for cruise control for an automotive vehicle, a controller is provided for running a self-diagnosis upon a receipt of the power supply via the first switch, for determining whether the apparatus operates normally or abnormally as a result of the run of the self-diagnosis, and for starting an acceptance of an input of the signal from the second switch when determining that the apparatus operates normally as the result of the self-diagnosis, and for issuing a warning signal when determining that the apparatus operates abnormally when the input of the signal from the second switch occurs at a time of the start of the acceptance of the input of the signal from the second switch and the input of the signal from the second switch occurs after a predetermined time has passed from the time when the acceptance of the input of the signal from the second switch occurs.

11 Claims, 2 Drawing Sheets

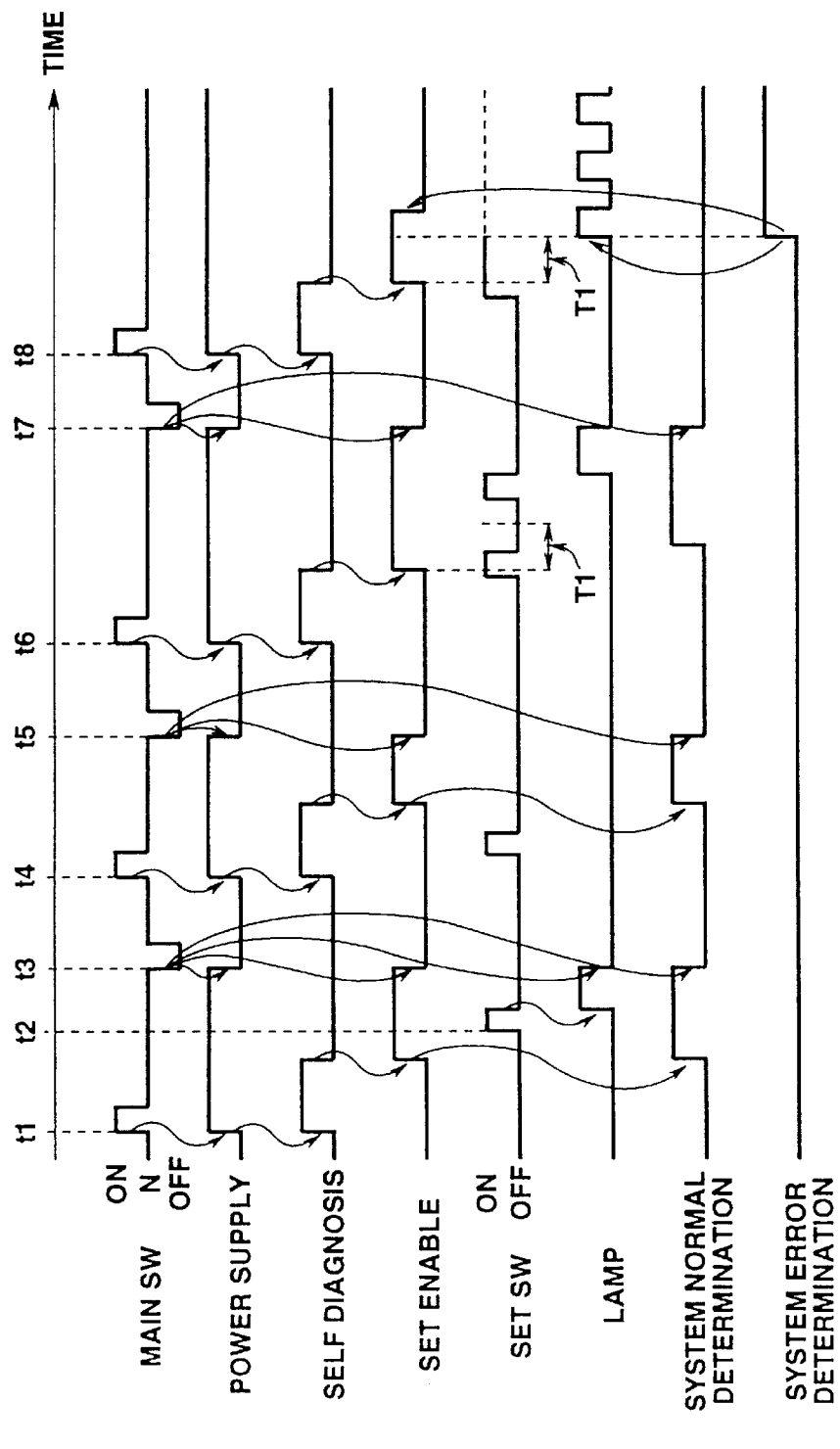

CRUISE CONTROL APPARATUS AND METHOD FOR AUTOMOTIVE VEHICLE

The contents of the Application No. Heisei 9-69670, with a filing date of Mar. 24, 1997 in Japan, are herein incorporated by reference.

BACKGROUND OF THE INVENTION a) Field of the Invention

The present invention relates to cruise control apparatus and method for an automotive vehicle which control a vehicle speed to maintain the vehicle speed at a set (target) vehicle speed through a vehicular engine throttle valve.

b) Description of the Related Art

A previously proposed cruise control apparatus for the vehicle is exemplified by a U.S. Pat. No. 4,835,696.

When a main switch of the previously proposed cruise control apparatus (also called ASCD (Automatic Speed Control Device)) is turned on, a power supply of a controller of the cruise control apparatus is turned on and a self-diagnosis program stored in the controller is started to run. When, as a result of the self-diagnosis, the controller determines that the cruise control apparatus operates normally (system normal) and enables an acceptance of an input through a set switch to set a target vehicle speed.

When the set switch is operated after the acceptance of the input of the set switch is enabled, the vehicle speed at the time of operation of the set switch is set to the target vehicle speed, an indicator light is illuminated, and the cruise control of the vehicle is started.

When the main switch is turned off, the power supply of the controller is interrupted, the cruise speed control is ended, the acceptance of the input of the set switch is disabled, and the indicator lamp is turned off.

On the other hand, when the set switch is turned on before the acceptance of the input of the set switch is enabled, the controller determines a system error, does not start the cruise control, and repeatedly turns on or off the indicator lamp. Such a situation as described above occurs if the set switch falls and remains in an on state (this failure is generally called "welded (sticky) failure".

It is noted that since, in the previously proposed cruise control apparatus, the main switch is placed far away from the set switch. Hence, it is impossible to operate simultaneously the set switch and the main switch during the run of the vehicle. Hence, it is impossible for the controller to determine the system error equal to the failure such that the set switch remains in the on state in terms of the operation of the set switch.

SUMMARY OF THE INVENTION

There is an industrial demand to reduce a cost of manufacturing the vehicle through a concentrated and reasonable arrangements of various switches. Hence, the main switch and set switch of the cruise control apparatus are needed to be rearranged.

However, if the main switch and the set switch are arranged on the vehicle mutually at adjacent positions, there is a possibility that both of the main and set switches are simultaneously operated by fingers of a driver's hand. If this simultaneous operation is carried out, the controller determines the system error equal to the welded (sticky) failure in the set switch in spite of the fact that the set switch does not in the welded (sticky) failure and issues a warning through the indicator lamp.

It is therefore an object of the present invention to provide cruise control apparatus and method which accurately determine the failure in the set switch and which carry out the warning only when the failure of the set switch occurs.

The above-described object can be achieved by an apparatus for an automotive vehicle, comprising: a first switch, responsive to a turn on thereof, for supplying a power supply to the apparatus; a second switch, responsive to a turn on thereof, for outputting a signal to start a cruise control of the apparatus a first switch; and a controller for running a self-diagnosis upon a receipt of the power supply via the first switch, for determining whether the apparatus operates normally or abnormally as a result of the run of the self-diagnosis, and for starting an acceptance of an input of the signal from the second switch when determining that the apparatus operates normally as the result of the self-diagnosis, and for issuing a warning signal when determining that the apparatus operates abnormally when the input of the signal from the second switch occurs at a time of the start of the acceptance of the input of the signal from the second switch and the input of the signal from the second switch occurs after a predetermined time has passed from the time when the acceptance of the input of the signal from the second switch occurs.

The above-described object can also be achieved by providing an apparatus for an automotive vehicle, comprising: first switching means, responsive to a turn on thereof, for supplying a power supply to the apparatus; second switch means, responsive to a turn on thereof, for outputting a signal to start a cruise control of the apparatus; third means for running a self-diagnosis upon a receipt of the power supply via the first switch means; fourth means for determining whether the apparatus operates normally or abnormally as a result of the run of the self-diagnosis; fifth means for starting an acceptance of an input of the signal from the second switch means when determining that the apparatus operates normally as the result of the self-diagnosis; sixth means for issuing a warning signal when the fourth means determines that the apparatus operates abnormally when the input of the signal from the second switch means occurs at a time of the start of the acceptance of the input of the signal from the second switch means and the input of the signal from the second switch means occurs after a predetermined time has passed from the time when the acceptance of the input of the signal from the second switch means occurs.

The above-described object can also be achieved by providing a cruise control method for an automotive vehicle comprises the steps of: a) providing a first switch for supplying a power supply to the apparatus; b) providing a second switch for outputting a signal to start a cruise control of the apparatus; c) running a self-diagnosis upon a receipt of the power supply via the first switch; determining whether the apparatus operates normally or abnormally as a result of the run of the self-diagnosis; e) starting an acceptance of an input of the signal from the second switch when determining that the apparatus operates normally as the result of the self-diagnosis; and f) issuing a warning signal when determining that the apparatus operates abnormally when the input of the signal from the second switch occurs at a time of the start of the acceptance of the input of the signal from the second switch and the input of the signal from the second switch occurs after a predetermined time has passed from the time when the acceptance of the input of the signal from the second switch occurs.

BRIEF DESCRIPTION OF THE DRAWINGS

FIGS. 2A, 2B, 2C, 2D, 2E, 2F, 2G, and 2H are integrally timing charts for explaining an operation of the cruise control apparatus shown in FIGS. 1A and 1B.

BEST MODE FOR CARRYING OUT THE INVENTION

Reference will hereinafter be made to the drawings in order to facilitate a better understanding of the present invention.

Figure 1A:
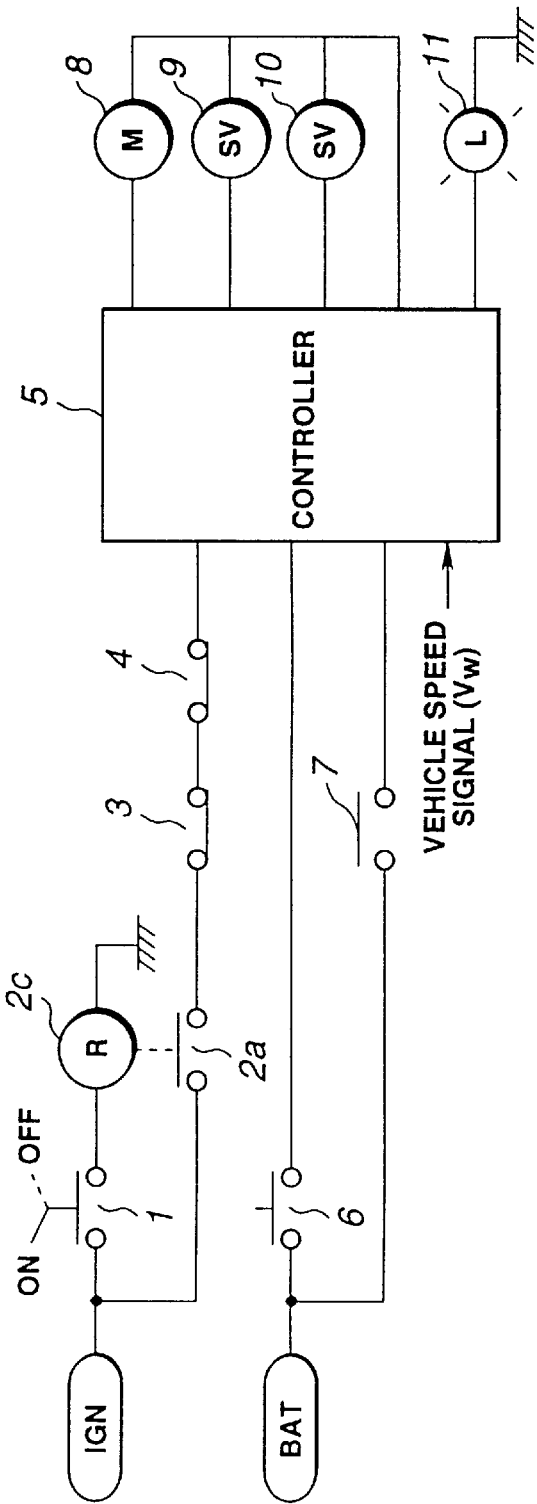
FIG. 1A is a circuit block diagram of a cruise control apparatus in a preferred embodiment according to the present invention.

FIG. 1A shows a preferred embodiment of a cruise control apparatus for an automotive vehicle according to the present invention.

Figure 1B:
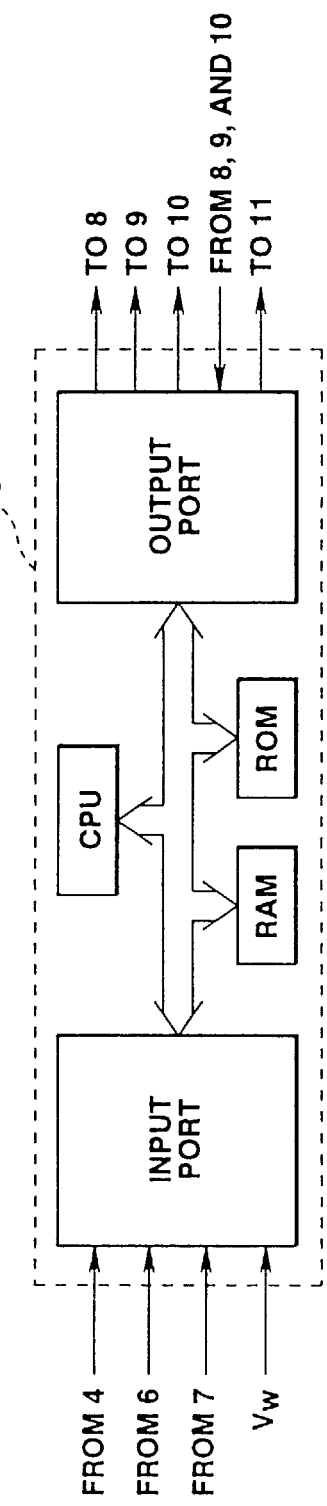
FIG. 1B is an internal circuit diagram of a controller shown in FIG. 1.

FIG. 1B shows a connection diagram of a controller shown in FIG. 1A.

In FIG. 1A, a main switch 1 of a see-saw type is connected between a DC power supply IGN and a controller 5. The main switch 1 turns on to supply the DC power to the whole cruise control apparatus and turns off to interrupt the power supply from the whole cruise control apparatus. When the main switch 1 is turned on, a relay coil 2C is energized so that a relay contact 2a is closed.

A shift position switch 3 and a cancel switch 4 are connected in series with the relay contact 2a.

The shift position switch 3 is turned off when a gear shift range of a transmission of a vehicle in which the cruise control apparatus in the embodiment shown in FIG. 1A is mounted is placed at a Neutral range position (N) or Parking range position (P).

The cancel switch 4 is opened (turned off) when a cancel button (not shown) for canceling the cruise control run of the vehicle through the cruise control apparatus.

When the main switch 1 is turned on, an ignition power supply IGN is supplied to a controller 5 via the relay contact 2a, the shift position switch 3, and the cancel switch 4. It is noted that the ignition power supply IGN is a power supply which is enabled to be supplied when an ignition key switch of an engine is placed at an ON position.

A set switch 6 is a switch for setting a target vehicle speed at which the vehicle cruises and for starting a cruise control at the set target vehicle speed. When the set switch 6 is turned on, a battery power BAT is supplied to a controller 5.

The controller 5 recognizes the operation of the set switch 6 when the battery power supply BAT is received and sets a vehicle speed derived from a vehicle speed sensor at a time of the operation of the set switch 6 to start the cruise speed control. In addition, a stop lamp switch 7 is a switch which is closed when a brake pedal is depressed. When the stop lamp switch 7 is closed, the controller 5 halts the cruise control.

The controller 5 includes a microcomputer having a CPU, ROM, RAM, an Input Port, and an Output Port as shown in FIG. 1B.

A vacuum pump motor 8, a release valve solenoid 9, and an air valve solenoid 10 are connected to the controller 5. The vacuum pump motor 8 is an electric motor used to drive a vacuum pump to generate a negative pressure in a negative pressure type throttle actuator (not shown). The release valve solenoid 9 and air valve solenoid 10 are solenoids used to drive valves to return the negative pressure type throttle actuator to the atmospheric pressure.

An indicator lamp 11 is connected to the controller 5. The controller 5 turns on the indicator lamp 11 when starting to execute the cruise control and turns on and off repeatedly the indicator lamp 11 when determining that the apparatus operates abnormally (system error). The controller 5 receives a vehicle speed ($V_w$) signal from a vehicle speed sensor (not shown).

It is noted that the main switch 1 and the set switch 5 are installed in the vehicle at mutually adjacent positions so as to enable a simultaneous turn on of both switches.

Next, FIGS. 2A through 2H show integrally a signal timing chart for explaining an operation of the preferred embodiment of the cruise control apparatus.

At a time t1, the main switch 1 is turned on. At this time, the relay coil 2c is energized and the ignition power supply IGN is supplied to the controller 5 via the relay contact 2a, the shift position switch 3, and the cancel switch 4. The controller 5 carries out the self-diagnosis (starts to run a self-diagnosis program) when the ignition power supply IGN is supplied to the controller 5 as shown in FIG. 2B. When as a result of the self-diagnosis the controller 5 determines that no system error occurs, the controller 5 starts to accept an input of a signal from the set switch 6, the set switch 6 is started to turn it on. When a falling edge of the signal from the set switch 6 occurs, the controller 5 sets a present vehicle speed based on the vehicle speed sensor to a target vehicle speed at which the vehicle cruises and starts to execute the cruise control. At the same time, the controller 5 turns on the indicator lamp 11.

When the set switch 1 is turned off at a time t3 during the execution of the cruise control, the relay coil 2c is deenergized so that the supply of the ignition power supply IGN is interrupted. The controller 5 disables the acceptance of the input of the signal from the set switch 6 and resets the determination of no system error (the apparatus operates normally).

In addition, suppose that the set switch 6 is operated at the time when the acceptance of the input of the signal from the set switch 6 is operated. This is explained at a time interval from t6 to t7.

At the time of t6, the main switch 1 is turned on so that the supply of the ignition power supply IGN and the self-diagnosis are started. If the self-diagnosis indicates that the apparatus operates normally, the controller 5 determines that the apparatus operates normally and enables the acceptance of the input of the signal from the set switch 6.

In a case when the set switch 6 has already turned on at the time when the acceptance of the input of the signal from the set switch 6 occurs, the controller 5 does not accept the input of the signal from the set switch 6. The controller 5 reconfirms whether the input of the signal from the set switch 6 occurs after a predetermined period T1 has passed from the time at which the acceptance of the input of the set switch 6 has started. Then, the controller 5 waits for the input of the turn-on signal from the set switch 6 at the time after the period T1. The controller 5 starts the execution of the cruise control if the input of the signal from the set switch 6 occurs and turns on the indicator lamp 11. The operation of the cruise control apparatus after the main switch 1 is turned off at the time t7 is the same as that at the time t3.

On the other hand, as shown in a time after the time t8, the set switch 6 has already been turned on at the time when the acceptance of the input of the signal from the set switch 6 is enabled. If the set switch 6 is still in the turn on state even after the predetermined time T1 has passed from the time at which the input of the acceptance of the signal from the set switch 6 occurs, the apparatus determines that the apparatus operates abnormally and turns on and off repeatedly the indicator lamp 11.

In the embodiment, the main switch 1 is of a see-saw type switch(toggle type switch). However, the main switch 1 may be of a cyclic type switch which alternatively turns on and off whenever operated.

It is noted that the self-diagnosis program of the cruise control apparatus is exemplified by a U.S. Pat. No. 4,928, 242 issued on May 22, 1990, the disclosure of which is herein incorporated by reference and the vacuum pump motor 8, the release solenoid valve 9, and the air valve solenoid 10 are exemplified by a U.S. Pat. No. 5,005,133 issued on Apr. 2, 1991, the disclosure of which is herein incorporated by reference.

What is claimed is:

1. An apparatus for an automotive vehicle, comprising:

a first switch, responsive to a turn on thereof, for supplying a power supply to the apparatus;

a second switch, responsive to a turn on thereof, for outputting a signal to start a cruise control of the apparatus; and a controller for running a self-diagnosis upon a receipt of the power supply via the first switch, for determining whether the apparatus operates normally or abnormally as a result of the run of the self-diagnosis, and for starting an acceptance of an input of the signal from the second switch when determining that the apparatus operates normally as the result of the self-diagnosis, and for issuing a warning signal when determining that the apparatus operates abnormally when the input of the signal from the second switch occurs at a time of the start of the acceptance of the input of the signal from the second switch and the input of the signal from the second switch occurs after a predetermined time has passed from the time when the acceptance of the input of the signal from the second switch occurs.

2. An apparatus for an automotive vehicle as claimed in claim 1, wherein the controller determines that the apparatus operates normally when the input of the signal from the second switch occurs at the time when the acceptance of the input of the signal from the second switch occurs and when no input of the signal from the second switch occurs after the predetermined time has passed from the time at which the acceptance of the input of the signal from the second switch occurs.

3. An apparatus for an automotive vehicle as claimed in claim 2, wherein the controller starts the cruise control upon the receipt of the signal from the second switch when at the time of the start of the acceptance of the input of the signal from the second switch, the input of the signal from the second switch occurs and when no input of the signal from the second switch occurs after the predetermined time has passed from the time of the start of the acceptance of the input of the signal from the second switch.

4. An apparatus for an automotive vehicle as claimed in claim 2, which further comprises a lamp connected to the controller which is turned on when the input of the signal from the second switch occurs after the controller determines that the apparatus operates normally.

5. An apparatus for an automotive vehicle as claimed in claim 1, wherein the lamp is repeatedly turned on and off when the controller issues the warning signal.

6. An apparatus for an automotive vehicle as claimed in claim 1, wherein the first switch and second switch are disposed at adjacent positions so as to enable a simultaneous turn on of the both the first and second switches.

7. An apparatus for an automotive vehicle as claimed in claim 1, which further comprises a vehicle speed sensor for detecting a vehicle speed of the vehicle and wherein the vehicle speed detected by the vehicle speed sensor when the controller determines that the apparatus operates normally and the input of the signal from the second switch occurs is a target vehicle speed at which the vehicle speed is maintained constantly.

8. An apparatus for an automotive vehicle as claimed in claim 1, wherein the first switch is a main switch of a toggle switch type connected between an ignition power supply for a vehicular engine and the controller.

9. An apparatus for an automotive vehicle, comprising:

first switching means, responsive to a turn on thereof, for supplying a power supply to the apparatus;

second switch means, responsive to a turn on thereof, for outputting a signal to start a cruise control of the apparatus;

third means for running a self-diagnosis upon a receipt of the power supply via the first switch means;

fourth means for determining whether the apparatus operates normally or abnormally as a result of the run of the self-diagnosis;

fifth means for starting an acceptance of an input of the signal from the second switch means when determining that the apparatus operates normally as the result of the self-diagnosis;

sixth means for issuing a warning signal when the fourth means determines that the apparatus operates abnormally when the input of the signal from the second switch means occurs at a time of the start of the acceptance of the input of the signal from the second switch means and the input of the signal from the second switch means occurs after a predetermined time has passed from the time when the acceptance of the input of the signal from the second switch means occurs.

10. A cruise control method for an apparatus of an automotive vehicle comprises the steps of:

a) providing a first switch for supplying a power supply to the apparatus;

b) providing a second switch for outputting a signal to start a cruise control of the apparatus;

c) running a self-diagnosis upon a receipt of the power supply via the first switch;

d) determining whether the apparatus operates normally or abnormally as a result of the run of the self-diagnosis;

e) starting an acceptance of an input of the signal from the second switch when determining that the apparatus operates normally as the result of the self-diagnosis; and f) issuing a warning signal when determining that the apparatus operates abnormally when the input of the signal from the second switch occurs at a time of the start of the acceptance of the input of the signal from the second switch and the input of the signal from the second switch occurs after a predetermined time has passed from the time when the acceptance of the input of the signal from the second switch occurs.

11. An apparatus for an automotive vehicle, comprising:

a first switch, responsive to a turn on thereof, for supplying a power supply to the apparatus;

a second switch, responsive to a turn on thereof, for outputting a signal to start a cruise control of the apparatus; and a controller for running a self-diagnosis upon a receipt of the power supply via the first switch, for determining whether the apparatus operates normally or abnormally as a result of the run of the self-diagnosis, and for starting an acceptance of an input of the signal from the second switch when determining that the apparatus operates normally as the result of the self-diagnosis, the controller determining that the apparatus operates normally when the input of the signal from the second switch occurs at the time when the acceptance of the input of the signal from the second switch occurs and when no input of the signal from the second switch occurs after a predetermined time has passed from the time at which the acceptance of the input of the signal from the second switch occurs.

* * * * *